Dec. 19, 1933.  A. J. SINCLAIR ET AL  1,940,330
SHOCK ABSORBING MOUNTING
Filed July 1, 1931   2 Sheets-Sheet 1
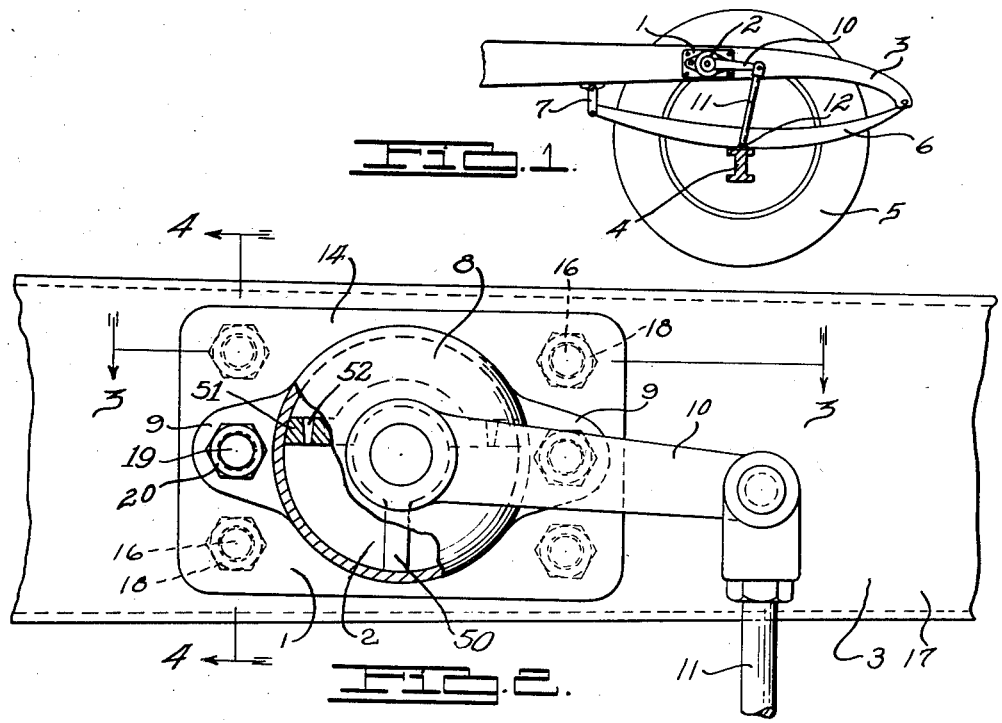
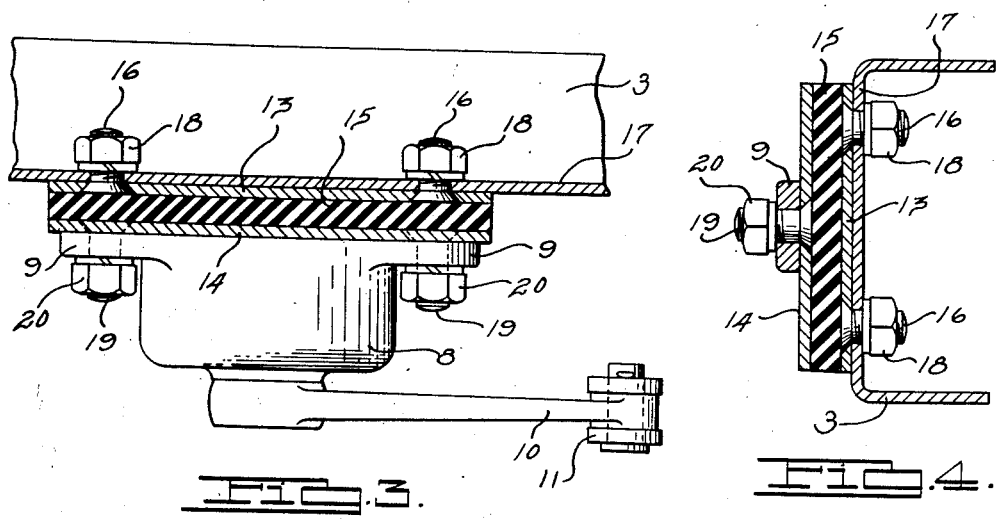
INVENTOR
ALFRED J. SINCLAIR AND
JOHN W. SAILLER.
BY
ATTORNEY

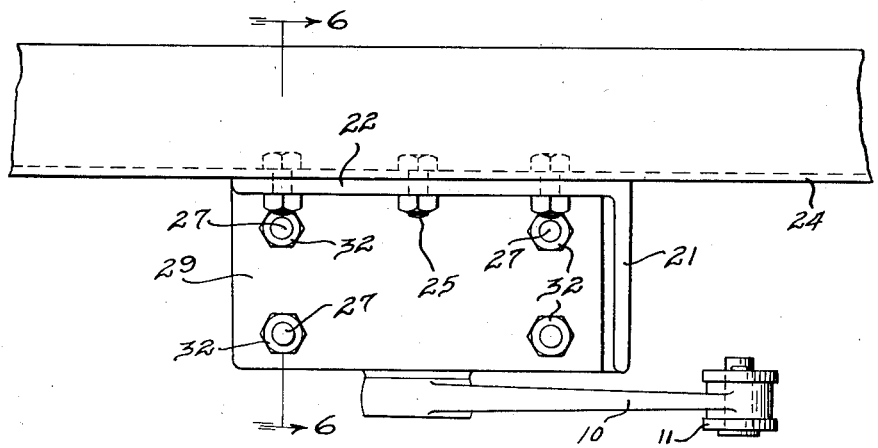
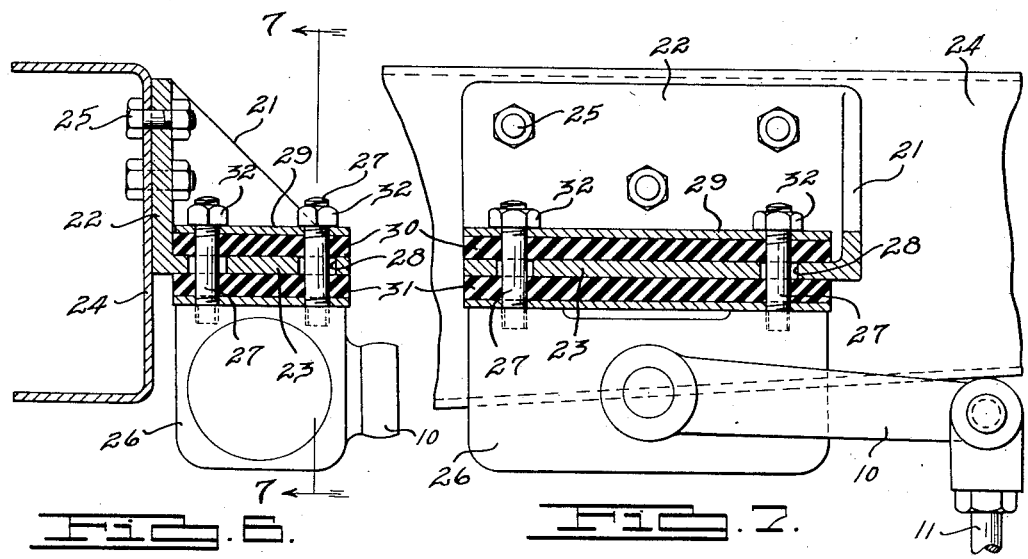

Patented Dec. 19, 1933

1,940,330

UNITED STATES PATENT OFFICE 1,940,330

SHOCK ABSORBING MOUNTING

Alfred J. Sinclair and John W. Sailler, Detroit, Mich., assignors to Chrysler Corporation, Detroit, Mich., a corporation of Delaware Application July 1, 1931. Serial No. 548,166

3 Claims. (Cl. 188—89)

This invention relates to an improved mounting for vehicle shock absorbing devices.

The main objects of the invention are to provide improved means for yieldably mounting a shock absorber on a vehicle chassis; to provide means in a shock absorber mounting for yieldably opposing slight relative movement of the sprung and unsprung parts of a vehicle and which is sufficiently sensitive to absorb the slight shocks and vibrations that occur when the vehicle is driven, for example, on city streets; and to provide yieldable material having sound insulating properties between a shock absorber and the rigid structure on which it is supported.

Further objects of the invention are to provide an improved shock absorber mounting which has a rubber element that forms the sole connection between the shock absorbing device and the structure upon which it is supported; and to provide a unitary mounting for a shock absorber that includes inseparable rigid parts which are bonded by vulcanization to the rubber element.

An illustrative embodiment of the invention is shown in the accompanying drawings, in which:

Fig. 1 is a fragmentary side elevation of a vehicle having a shock absorber that is supported by a mounting which embodies the invention.

Fig. 2 is a fragmentary side elevation of a shock absorber and its mounting illustrating the manner in which the mounting is fixed to a side frame of a vehicle chassis.

Fig. 3 is a horizontal section taken on the line 3—3 of Fig. 2.

Fig. 4 is a vertical section taken on the line 4—4 of Fig. 2.

Fig. 5 is a plan view of a shock absorber assembly which includes a mounting that embodies a modified form of the invention and illustrating the manner in which the mounting is fixed to a chassis frame.

Fig. 6 is a vertical section taken on the line 6—6 of Fig. 5.

Fig. 7 is a vertical section taken on the line 7—7 of Fig. 6.

In the forms shown in the drawings, my improved shock absorber mounting 1 is employed to support a shock absorber 2 which coacts between the sprung portion of a vehicle, including a chassis frame 3, and the unsprung portion of a vehicle including an axle 4 and road wheels 5. The sprung and unsprung portion of the vehicle are yieldably connected together in a conventional manner by a leaf spring 6 which is swingably attached to the chassis frame at its rear end by a shackle 7 and pivotally attached to the frame at its forward end.

The shock absorber includes a body portion 8 which, in the form shown, consists of a hollow metal housing having protruding flanges 9 on its respectively opposite sides. Journaled in the housing 8 is a crank having an external arm 10 which is pivotally attached at one end to a link 11. The link 11 is pivotally secured at 12 to a bracket which is fixed on the axle 4. Provided in the interior of the housing 8 of the shock absorber is suitable retarding apparatus of hydraulic, frictional or other type which opposes rotation of the arm 10 and thereby yieldably resists relative movement of the sprung and unsprung portions of the vehicle. Hydraulic retarding apparatus is shown in Fig. 2 for the purpose of illustration. This apparatus includes a vane 50 disposed within the body portion 8 and fixed to the journaled portion of the crank. The interior of the body portion 8 is divided into compartments by a partition 51 which extends on respectively opposite sides of the vane 50. The partition 51 is provided with orifices 52 for permitting controlled flow of a hydraulic medium, such as oil, from one chamber to the other during the oscillatory movement of the vane 50 which occurs when the crank rotates relative to the body portion of the shock absorber during relative movements of the sprung and unsprung portions of the vehicle in respectively opposite directions. This retarding apparatus may be conditioned so as to oppose rotation of the crank in both directions for controlling both compression and rebounding of the spring, or it may be conditioned to control only the rebounding action thereof.

In order to oppose violent movement of the sprung and unsprung parts of the vehicle, the retarding mechanism is called upon to resist movement of the crank and external arm 10 with substantial rigidity. A shock absorbing device having such characteristics is not adapted to respond to the slight shocks and vibrations to which a vehicle is subjected when driven over comparatively smooth city streets. Shocks of such low amplitude may be conveniently absorbed by attaching the shock absorber to the frame with a mounting which yieldably opposes limited movement of the shock absorbing device relative to the frame.

The shock absorber mounting illustrated in Figs. 1 to 4 inclusive yieldably supports the body portion 8 of the shock absorber so that it has limited freedom of movement relative to the vehicle chassis frame. This mounting comprises a unitary structure having inseparable parts which include a pair of spaced plates 13 and 14 between which is disposed a layer or block 15 of yieldable material, preferably rubber, which is rigidly attached to the opposed side faces of the plates by vulcanized bonds. Bolts 16 protrude outwardly from the rigid plate 13 and are received in apertures in the web 17 of the side member of the chassis frame, as illustrated in Fig. 3. Threaded on the bolts 16 are nuts 18 which rigidly fix the plate 13 to the chassis frame. The outer plate is also provided with outwardly extending bolts 19 which are received in apertures formed in the flanges 9 of the shock absorber body 8. The shock absorber is rigidly secured on the plate 14 by nuts 20 which are threaded on the bolts 19.

The rubber block 15 independently supports the shock absorbing device and forms the sole connection between the latter and the chassis frame. The rubber of which the block 15 is formed is preferably sufficiently yieldable to permit limited movement of the shock absorbing device with respect to the chassis frame under the influence of slight shocks and vibrations that have amplitudes lower than the forces required to rotate the crank and outer arm 10 against the action of the retarding mechanism. The rubber block 15 also has a substantial sound insulating capacity, and since it forms the sole connection between the shock absorber and the chassis frame, it successfully prevents the transmission of sound impulses through the shock absorbing device, from the unsprung portion of the vehicle to the sprung portion thereof. Movement of the shock absorbing device relative to the chassis frame places the rubber block 15 under shearing stresses which the vulcanized bonds between the rigid and yieldable parts of the mounting are particularly adapted to resist.

In the form shown in Figs. 5 to 7 inclusive, my improved shock absorber mounting includes a rigid angle bracket 21 having a vertical flange 22 and a horizontal flange 23. The vertical flange 22 of the bracket is rigidly secured to the web 24 of a side member of a chassis frame by bolts 25. A shock absorber 26 of any conventional form is yieldably mounted on the horizontal flange 23 by bolts 27 which extend through enlarged apertures 28 in the horizontal flange and through apertures in a plate 29 which is located in spaced relation to the upper side of the horizontal flange. Rubber pads or blocks 30 and 31 are disposed between the upper rigid plate 29 and the upper side of the horizontal flange, and between the lower side of the latter and the shock absorber, respectively. The bolts 27 have nuts 32 which are tightened sufficiently to place the rubber blocks 30 and 31 under a desired degree of compression.

The rubber blocks 30 and 31 are sufficiently yieldable to permit movement of the shock absorber relative to the bracket upon which it is mounted under the influence of the slight shocks and vibrations which are created during operation of a vehicle on city streets and the shock absorbing device is preferably conditioned so as to yieldably oppose more violent shock and vibration resulting from the tendency of the sprung and unsprung portions of the vehicle to move relative to each other when the road wheels of the vehicle encounter severe bumps and irregularities.

With this form of the invention, the rubber blocks, which have sound insulating properties, also prevent direct metal to metal contact between the shock absorber and its bracket and thereby reduce the transmission of sound impulses from the shock absorbing device to the sprung portion of the vehicle.

Although but several specific embodiments of this invention have herein been shown and described, it will be understood that various changes in the size, shape and arrangement of parts may be made without departing from the spirit of our invention and it is not our intention to limit its scope other than by the terms of the appended claims.

What we claim is:

1. In a vehicle having sprung and unsprung portions, the combination of a shock absorber for coacting between said portions including a body part and a relatively rotatable member journaled on said body part and connected with one of said portions of the vehicle, means for yieldably opposing relative rotation of said body part and rotatable member, and a layer of resilient material between said body part and the other portion of said vehicle disposed in a plane substantially normal to the axis of rotation of said member and having its opposite sides fixed to said body part and to the latter portion of said vehicle respectively for yieldably opposing rotation of said body part relative thereto.

2. In a vehicle having sprung and unsprung portions, the combination of a shock absorber for controlling relative movement of said sprung and unsprung portions including a body part and a rotatable member journaled thereon and connected with the unsprung portion of said vehicle, means for yieldably opposing relative rotation of said body part and member, and a rubber pad having its opposite faces fixed to said body part and the sprung portion of said vehicle respectively extending in respectively opposite directions on all sides of the axis of rotation of said member and arranged so as to yieldably support said body part for limited oscillatory movement substantially about said axis.

3. In a vehicle having sprung and unsprung portions, the combination of a shock absorber for controlling relative movement of said sprung and unsprung portions including a body part and a rotatable member journaled thereon and connected with the unsprung portion of said vehicle, means for yieldably opposing relative rotation of said body part and member, and a resilient mounting disposed between said body part and the sprung portion of said vehicle having a pair of rigid plates, one fixed to said sprung portion and the other to said body part and including an intermediate plate-like rubber pad having its opposite faces bonded to the adjacent faces of said rigid plates, said pad being disposed in a plane normal to the axis of said rotatable member and adapted to yieldably oppose rotation of said body part about the axis of rotation of said member.

ALFRED J. SINCLAIR.
JOHN W. SAILLER.